UNITED STATES PATENT OFFICE.

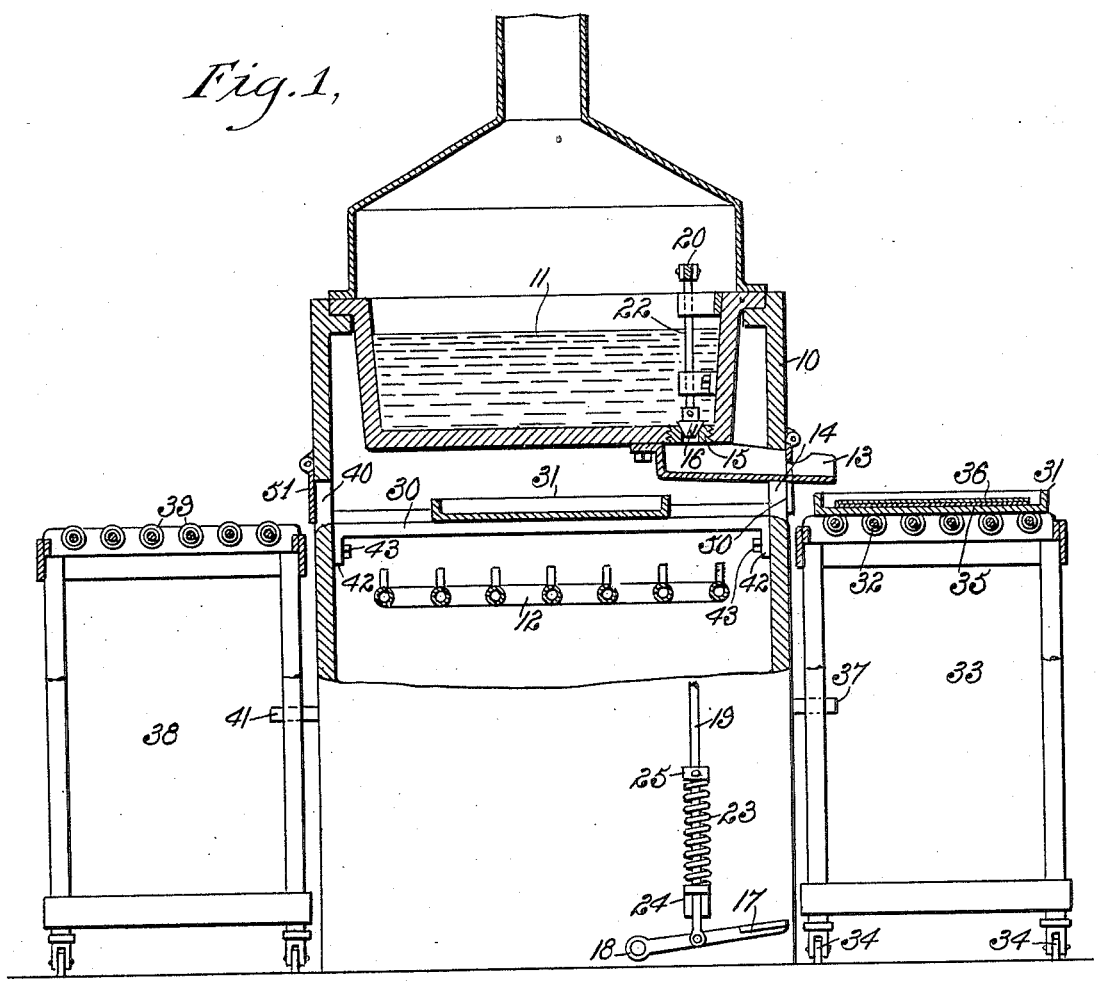

EDWARD KEEFE, OF JERSEY CITY, NEW JERSEY.

BACKING APPARATUS.

1,205,952.　　　　　Specification of Letters Patent.　　Patented Nov. 21, 1916.

Application filed July 12, 1916. Serial No. 108,805.

*To all whom it may concern:*

Be it known that I, EDWARD KEEFE, a citizen of the United States, and a resident of Jersey City, in the county of Hudson and State of New Jersey, have invented a new and Improved Backing Apparatus, of which the following is a full, clear, and exact description.

The invention relates to electrotyping and more particularly to the reinforcing of the thin copper shells by a metal backing to form a strong and durable printing plate.

The object of the invention is to provide a new and improved backing apparatus arranged to reduce the number of operations to a minimum by the use of a very simple apparatus and without danger of splashing the molten metal and dispensing entirely with the use of ladles and overhead means for carrying the tray or pan containing the shell from one apparatus to another.

In order to accomplish the desired result, use is made of a furnace having a melting pot and a source of heat for heating the melting pot and the backing metal contained therein, a support within the said furnace and adapted to temporarily support a tray for heating the same by the said source of heat, and a backing table adapted to receive and support the heated tray from the furnace to allow of placing the shell and the solder into the heated tray, the heat of the latter causing the solder to melt, the tray while on the said backing table receiving the molten metal from the said melting pot.

A practical embodiment of the invention is represented in the accompanying drawings forming a part of this specification, in which similar characters of reference indicate corresponding parts in both views.

Figure 1 is a sectional side elevation of the backing apparatus on the line 1—1 of Fig. 2; and Fig. 2 is a plan view of the same with the hood removed.

In the manufacture of electroplates for printing a very thin copper shell is first produced for electroplating in the usual manner, and the face of the shell is next hardened by a coating of steel or nickel or other means. The shell is next reinforced with a backing and this is done by first melting solder on the back of the shell and then pouring the molten backing metal onto the solder to a required thickness to form a strong printing plate. In my United States Patent No. 1,183,649, dated May 16, 1916, above described, the backing operation is carried out by placing the shell face down in a tray or pan, then placing the sheet of solder onto the back of the shell and heating the pan in a heating stand arranged adjacent a backing table for receiving and supporting the tray after the solder is melted. The tray on the backing table extends under a spout leading from a melting pot so that the molten metal in the latter can be directed into the tray to form the backing on the shell. By the apparatus presently to be described in detail, the separate heating stand is entirely dispensed with and the same source of heat used for heating the melting pot is used for heating the tray to cause melting of the solder on the back of the shell, as above explained.

In its general construction, the furnace 10 is provided with a melting pot 11 below which is arranged a source of heat 12, preferably in the form of a gas burner, to permit of heating the backing metal contained in the melting pot 11. The melting pot 11 is provided with a discharge spout 13 extending through an opening 14 formed in one side of the furnace 10. The bottom of the pot 11 is provided with a valve seat 15 leading to the spout 13 and controlled by a valve 16 which when opened permits the molten backing metal to flow from the pot 11 into the spout 13. The opening and closing of the valve 16 is controlled by an operator manipulating a treadle 17 fulcrumed at 18 on the front of the furnace 10 and the said treadle 17 is pivotally connected by a link 19 with a lever 20 fulcrumed on a bracket 21 arranged in the upper portion of the melting pot 11. The inner end of the lever 20 is pivotally connected with the upper end of the valve stem 22 of the valve 16. A spring 23 is coiled on the link 19 and rests with one end on a bracket 24 attached to the front of the furnace 10, and the other end of the spring 23 abuts against a collar 25 secured to the link 19.

By the arrangement described, the valve 16 is normally held in a closed position, but when the operator swings the treadle 17 downward against the tension of the spring 23 then the valve 16 is moved off its seat 15 to allow the molten backing metal to flow from the pot 11 into the spout 13. When the operator releases the treadle 17 then the spring 23 returns the valve 16 to closed position on its valve seat 15.

Intermediate the under side of the melting pot 11 and the source of heat 12 is arranged a support 30 extending from one side of the furnace to the other and registering with the bottom of the side opening 14. This support 30 is adapted to temporarily support a pan or a tray 31 which is heated by the source of heat 12. After the tray is heated to a desired degree it is drawn or pushed along the support 30 through the opening 14 onto rollers 32 journaled on a backing table 33 provided with wheels 34 to permit of moving the backing table about. The shell 35 and the solder 36 are placed into the tray 31 as soon as it reaches the backing table 33 and as this tray is heated it is evident that the heat causes the solder 36 to melt on the back of the shell 35. By reference to Fig. 1, it will be seen that the tray 31 while on the backing table 33 extends under the terminal of the spout 13 so that when the operator opens the valve 16 as previously explained then the molten backing metal is sweated onto the back of the shell 35 to form a strong and durable printing plate. The backing table 33 is readily positioned alongside the furnace 10 by the use of a stop 37 projecting from this side of the furnace to allow of properly positioning the backing table relatively to the spout 13 and the support 30. After the desired amount of backing metal has passed into the tray 31 the operator releases the treadle 17 to allow the valve 16 to close and the portable backing table 33 is now wheeled away and another backing table is placed in position alongside the furnace for receiving the next heated tray from the support 30.

In order to facilitate the operation, the other side of the furnace 10 is provided with an opening 40 directly opposite the opening 14 and likewise in register with the support 30 so that a second backing table 38 supporting an empty tray 31 on rollers 39 can be readily moved into position on this side of the furnace to allow of pushing this tray from the backing table 38 through the opening 40 onto the support 30 to be heated from the source of heat 12 during the time the molten metal is poured from the pot 11 by way of the spout 13 into the tray 31 supported on the backing table 33 at the other side of the furnace as above explained. The second backing table 38 is readily positioned on this side of the furnace by abutting against the stop 41 similar to the stop 37. The support 30 is preferably in the form of spaced parallel angle irons provided at their ends with depending flanges 42 fastened by bolts 43 to the inner faces of the sides of the furnace 10. By the arrangement described a tray 31 can be readily moved into position on the support 30 by way of either side opening 14 or 40 or removed from the support by way of the opening 14. The openings 14 and 40 are normally closed by hinged doors 50 and 51, which can be readily swung open to permit of removing the heated shell from within the furnace 10 and moving a shell to be heated into the furnace onto the support 30 as above explained. It is understood that the trays passed onto the support 30 by way of the opening 40 are removed from the support 30 by way of the other opening 14. The door 50 is cut out for the passage of the spout 13 and the doors 50 and 51 are provided with suitable handles 52, 53 (see Fig. 2) to permit of swinging the doors into open position for removing the tray from the furnace or pushing a tray into the same.

It is understood that it is not absolutely necessary to use the second side opening 40 as an empty tray may be pushed from the backing stand 33 through the opening 14 into the furnace and onto the support 30 to be heated from the source of heat 12, and when this has been done the heated tray can be pulled out through the opening 14 back onto the backing stand 33 to then receive the shell 35, the solder 36 and the backing metal from the pot 11, as above explained.

It is understood that the tops of the rollers 32 and 39, the bottoms of the openings 14 and 40 and the supports 30 are practically on the same level to permit of readily transferring the tray from the backing stand onto the support or from the latter onto a backing stand.

Having thus described my invention, I claim as new and desire to secure by Letters Patent:

1. A backing apparatus for printing plates, comprising a furnace having a melting pot and a source of heat for heating the melting pot, a support within the said furnace and adapted to temporarily support a tray for heating the same by the said source of heat, and a backing table adapted to receive and support the heated tray from the furnace to allow of placing the shell and the solder into the heated tray, the heat of the latter causing the solder to melt, the tray while on the said backing table receiving the molten metal from the said melting pot.

2. A backing apparatus for printing plates, comprising a furnace having a melting pot adapted to contain the backing metal and provided with a discharge spout, a source of heat for heating the melting pot to melt the backing metal therein, a support within the said furnace for temporarily supporting a tray to heat the same by the said source of heat, and a backing table adapted to receive the said heated tray from the furnace and to support the tray under the said spout to allow the molten backing metal to flow from the said melting pot into the tray.

3. A backing apparatus for printing plates, comprising a melting pot having a discharge spout for the backing metal, a support underneath the said melting pot for removably supporting a tray, a source of heat for heating the melting pot and the said tray when in position under the said melting pot, and a backing table adapted to receive the heated tray from the said support and to support the tray directly under the said spout to allow the molten metal from the said melting pot to flow into the tray.

4. A backing apparatus for printing plates, comprising a furnace having a melting pot provided with a valved outlet spout, the said furnace having a side opening through which extends the spout, a source of heat in the furnace, a support in the said furnace intermediate the said melting pot and the said source of heat, the ends of the support leading to the said side opening, the said support being adapted to temporarily support a tray to be heated by the said source of heat, and a portable backing table at the side of the furnace having the spout, the backing table being below the spout and on a level with the said support to allow of moving the heated tray out of the furnace through the side opening and onto the backing table to support the tray under the spout to receive the molten backing metal at the time the spout valve is opened.

5. A backing apparatus for printing plates, comprising a furnace having a melting pot provided with a valved outlet spout, the said furnace having a side opening through which extends the spout, a source of heat in the furnace, a support in the said furnace intermediate the said melting pot and the said source of heat, the ends of the support leading to the said side openings, the said support being adapted to temporarily support a tray to be heated by the said source of heat, a portable backing table at the side of the furnace having the spout, the backing table being below the spout and on a level with the said support to allow of moving the heated tray out of the furnace through the side opening and onto the backing table to support the tray under the spout to receive the molten backing metal at the time the spout valve is opened, the said furnace having a second side opening located opposite the first-named side opening and likewise in register with the said support, and a second portable table at this side of the furnace and supporting an empty tray to be pushed through the second side opening onto the support to be heated at the time the molten metal is flowing into the first tray.

EDWARD KEEFE.